Figure 1:
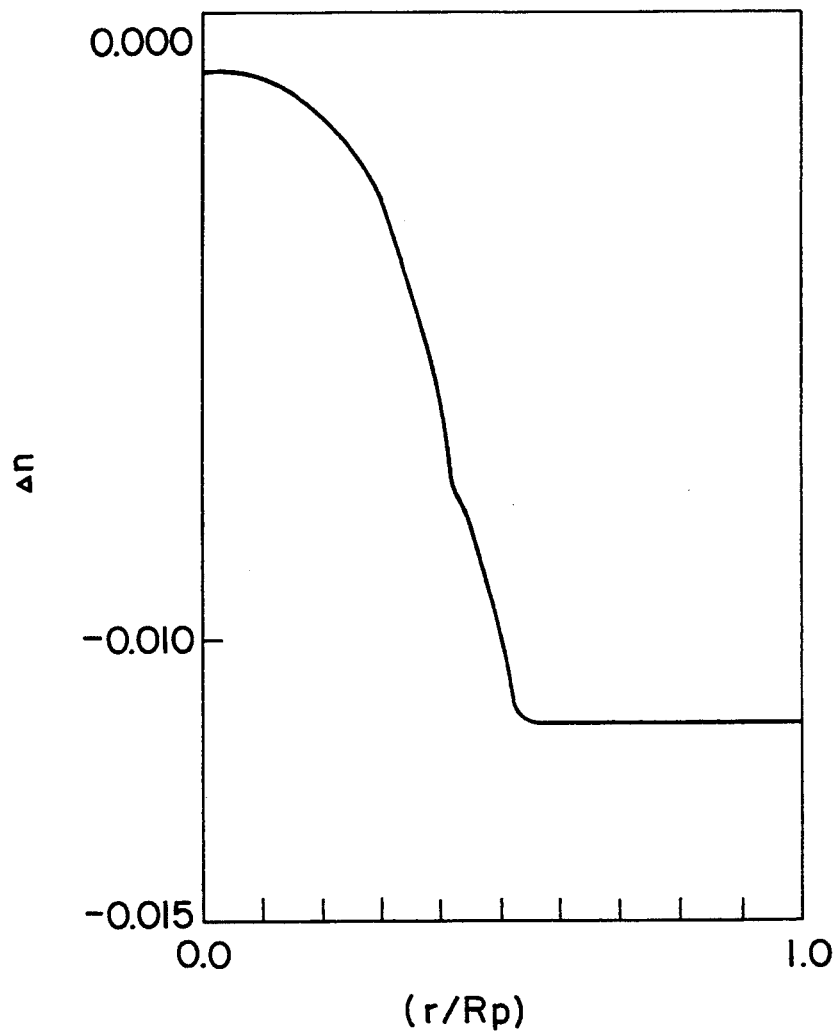

United States Patent
Sasaki et al.

[11] Patent Number: 5,450,232
[45] Date of Patent: Sep. 12, 1995

[54] POLYMER OPTICAL FIBER AMPLIFIER

[75] Inventors: Keisuke Sasaki, Tokyo; Yasuhiro Koike, Kanagawa, both of Japan

[73] Assignee: Nippon Petrochemicals, Co., Ltd., Tokyo, Japan

[21] Appl. No.: 142,460

[22] PCT Filed: Mar. 26, 1993

[86] PCT No.: PCT/JP93/00371
§ 371 Date: May 9, 1994
§ 102(e) Date: May 9, 1994

[87] PCT Pub. No.: WO93/19505
PCT Pub. Date: Sep. 30, 1993

[30] Foreign Application Priority Data
Mar. 26, 1992 [JP] Japan .................. 4-068244

[51] Int. Cl.⁶ .............................. H01S 3/16
[52] U.S. Cl. .......................... 359/341; 372/6
[58] Field of Search ............ 359/341, 342; 385/24; 264/1.5; 372/6, 39

[56] References Cited

U.S. PATENT DOCUMENTS

| | | | |
|---|---|---|---|
| 3,675,157 | 7/1972 | Kaminow et al. | 372/6 |
| 3,894,857 | 7/1975 | Uchida et al. | 359/341 |
| 4,015,217 | 3/1977 | Switzer | 359/341 |
| 4,139,342 | 2/1979 | Sheldrake et al. | 372/39 |
| 4,523,319 | 6/1985 | Pfost | 372/66 |

FOREIGN PATENT DOCUMENTS 63-502067 11/1988 Japan .................. 359/341

*Primary Examiner*—Nelson Moskowitz
*Attorney, Agent, or Firm*—Wenderoth, Lind & Ponack

[57] ABSTRACT

The present invention addresses a polymer optical fiber amplifier consisting of GI type fibers of polymers containing stimulated emission compounds. An amplifier of high efficiency and wide bandwidth using GI type plastic fibers is realized.

3 Claims, 3 Drawing Sheets

POLYMER OPTICAL FIBER AMPLIFIER

TECHNICAL FIELD

The present invention relates to a polymer optical fiber amplifier, or more specifically, to a new GI (Granded Index) type polymer optical fiber amplifier which is useful as a highly efficient and wide bandwidth amplifier.

BACKGROUND ART

Polymer optical fibers have been expected to be an optical transmission device to be used in local area networks (LAN) and optical sensors because of their favorable characteristics of processability, low cost and ease of handling. A sufficiently wide bandwidth is obtainable with the polymer optical fibers because both GI and SM (single mode) types can be manufactured today. However, their drawback is that the transmission loss is greater than that of quartz-base optical fibers. It seems possible to reduce the loss by deuteration and fluorination of polymers, but such reduction effects may be limited. For this reason, people are expecting development of a higher performance amplifier which is adaptable to optical fiber systems as a means to recover such loss. This is because the transmission distance of polymer optical fibers is approximately 200 meters, and all optical LANs which seem necessary in the future can be constructed with polymer optical fibers if a polymer optical fiber amplifier is successfully developed. Under these circumstances, development of a polymer optical fiber amplifier is much expected.

No report, however, has ever been published regarding such a fiber amplifier.

The present invention has been performed against the above condition. The objective of the present invention is to offer a new polymer optical fiber amplifier which improves the problem of transmission loss of conventional optical fibers, and significantly enhances the performance of a polymer optical fiber system by the use of its excellent amplifying operation.

DISCLOSURE OF INVENTION

The present invention aims at solving the above tasks and offers a polymer optical fiber amplifier characterized by being composed of GI type plastic optical fibers containing stimulated emission compounds.

The optical fiber amplifier of the present invention operates on a principle quite different from that of so-called laser oscillators. It is a piece of equipment clearly distinguished from laser oscillators, and amplifies signal light separately input from a light source independent of excitation light (pumping light). The wavelength of the signal light must be different from the wavelength of the excitation light. Except this condition, wavelengths, intensity, etc. can be set freely. A laser oscillator, on the other hand, oscillates light of specified wavelengths emitted from excited active substances by reflecting the light a number of times between two reflecting mirrors which together compose a Fabry-Perot interferometer; it is not that an independent signal light from a separate light source is input. The wavelength of the resonant light source is controlled by the gap between the two reflecting mirrors of the Fabry-Perot interferometer.

The use of the present invention allows for manufacture of organic dye or organic pigment doped GI type polymer optical fibers having a light amplification function in the visible light range by doping chemical compounds having a stimulated emission function such as organic dye or organic pigments into GI type polymer optical fibers. The amplification function of the above polymer optical fibers has been verified in tile experiments. The present invention has been completed based on the above knowledge.

The organic dye or organic pigment doped GI type polymer optical fibers allows for amplifying various wavelengths in the visible light range by selecting an organic dye or organic pigment for doping from a great variety of available organic dye or organic pigment in accordance with the wavelength one wishes to amplify.

Compared with the SI (Step Index) type polymer optical fibers, the GI type polymer optical fibers will maintain coherency of signal light, amplified light and excitation light, and thus can be a highly efficient wide-band amplifier. The SI type polymer optical fibers have a large reflection loss at the interface between the core and the clad, but the GI type polymer optical fibers have a small reflection loss therein, which fact also contributes to the making of a highly efficient amplifier.

The diameter of the GI type polymer optical fibers is large as compared with the SM (single mode) type (core diameter 10 $\mu$m or less), and is 50 $\mu$m to 10 mm, or preferably 50 $\mu$m to 1 min. It is possible for the GI type polymer optical fibers to receive light from semiconductor lasers and other elements with ease. The large size of the fiber diameter makes it easy to connect fibers, improves adaptability with optical fiber systems, and further enhances efficiency. In addition, the GI type polymer optical fiber amplifier has excellent characteristics such as low noise. As for the quartz-base optical fibers, Er-doped fiber amplifiers have already been developed. The polymer optical fiber amplifier according to the present invention is expected to have a more efficient amplification than the Er-doped quartz-base optical fibers because organic dye or organic pigment intrinsically have a larger amplification factor (gain) than Er. Actually, in the case of quartz-base optical fibers, high temperature heating (at 1,600° to 2,000° C.) is unavoidable during manufacture and drawing of preforms to fibers, and doping of organic dye or organic pigment is considered difficult. In the case of polymer optical fibers, on the other hand, organic dye or organic pigment will not be destroyed in the production process, allowing for doping and the use of the excellent characteristics of organic dye or organic pigment. For this reason, the polymer optical fibers according to the present invention is expected to become a key device in optical LANs, data links and optical computing which will be realized in the near future.

Figure 2:
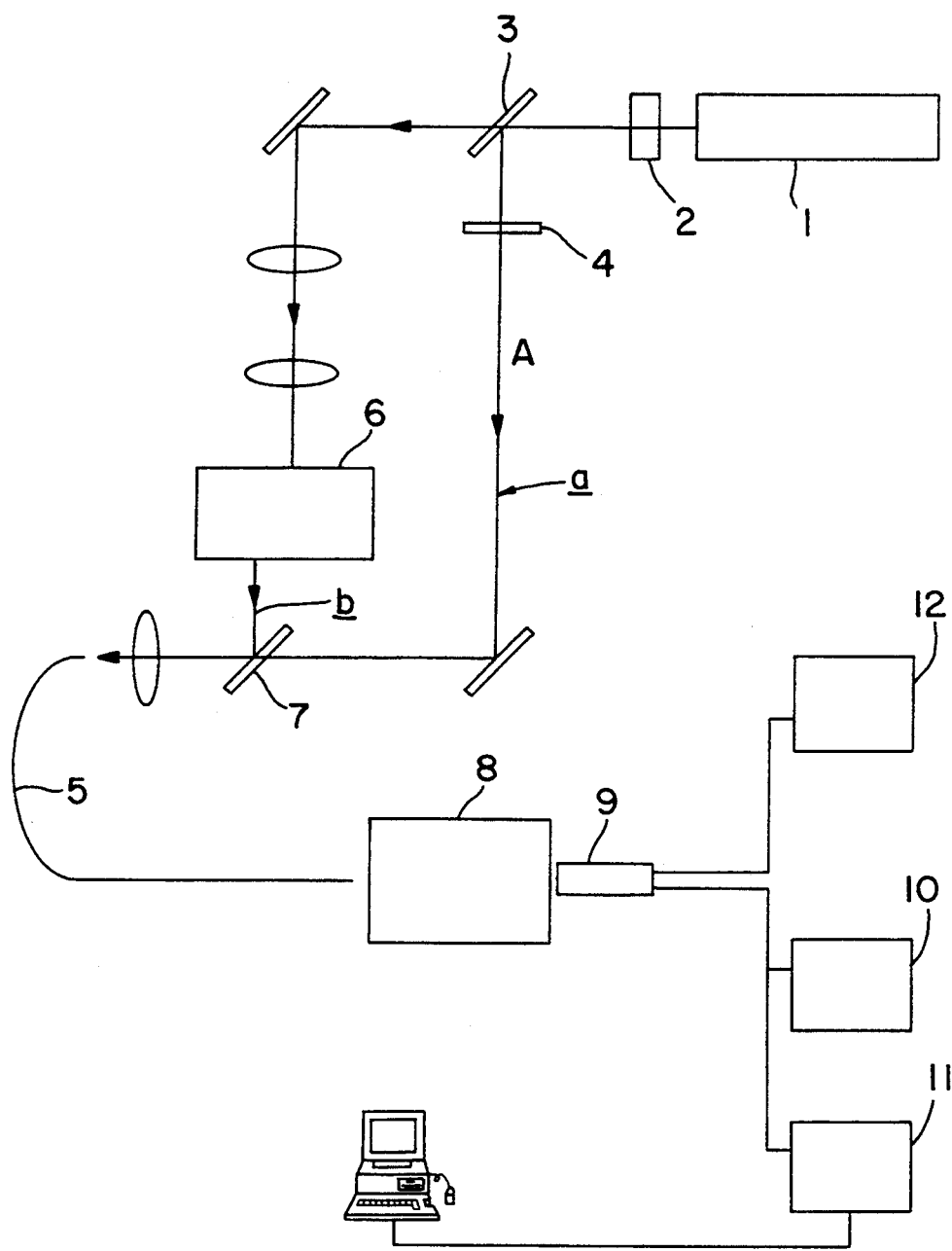
Figure 3:
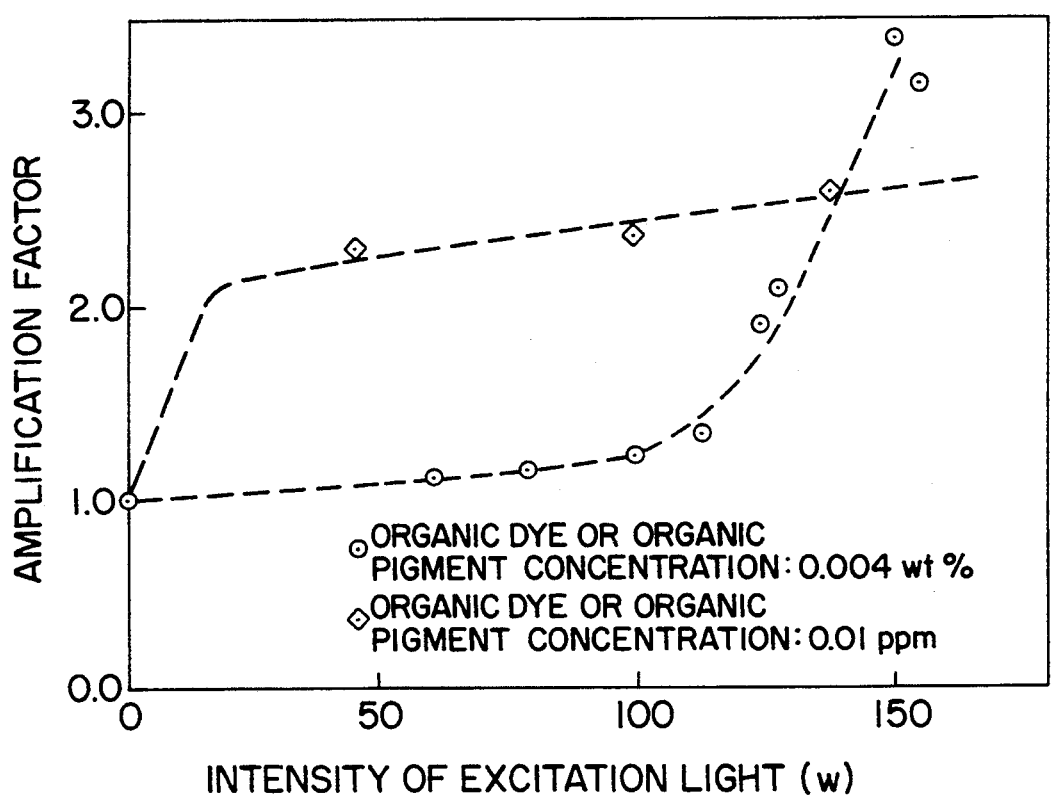

BRIEF DESCRIPTION OF DRAWINGS FIG. 1 shows the relation between refractive index and normalizing radius. It shows the refractive index profile of preforms for the manufacture of optical fiber amplifiers according to the present invention. FIG. 2 is the optical system for the evaluation of amplification operation. FIG. 3 is a graph showing the relation between the intensity of excitation light and amplification factor as a working example of the present invention.

Symbols in the figure have the following meaning:
1. Nd:YAG laser
2. KD* P single crystal
3. Beam splitter
4. ND filter 5. Organic dye or organic pigment doped polymer optical fiber
6. Pigment laser
7. Beam splitter
8. Spectroscope
9. Photomultiplier
10. Oscilloscope
11. Boxcar integrator
12. High stability power supply
    a. Excitation light
    b. Signal light

BEST MODE FOR CARRYING OUT THE INVENTION

The principal aspects of the fiber amplifier according to the present invention are further described below. A number of organic dye or organic pigment for constituting the present invention have a high fluorescence efficiency, and show a highly efficient fluorescent characteristics over a significantly wide visible light range. Light amplification over a significantly wide spectrum region is possible by using these characteristics.

An inverse profile state can be produced by shedding excitation light efficiently on an organic dye or organic pigment of a good fluorescence efficiency. Stimulated emission occurs and light is amplified when coherent light (signal light) of a wavelength equal to the fluorescence wavelength is incident upon the inverse profile state. However, each of the fluorescence spectrum and absorption spectrum has a spread and both may overlap over a certain wavelength range. For this reason, the amplification factor (gain) varies with the wavelength.

It is possible to confine such organic dye or organic pigment as described above, excitation light and signal light in a narrow range over a long distance if the organic dye or organic pigment are doped into polymer optical fibers. That is, a very efficient light amplification is achieved because the energy density is high and the mutual operation length is long.

The stimulated emission compounds used in the present invention, typical ones being organic dye or organic pigment, are either organic or inorganic compounds having a stimulated emission function. Concentration of these compounds contained in the fiber is not particularly limited but appropriately determined by the level of the stimulated emission function and light absorbency. The concentration is normally 0.0001 ppm or above. If the compound concentration is too high, the amplification efficiency sharply decreases, and the deterioration (decrease in intensity of amplification light) may occur as a result of the amplified light absorbed by the relevant compound. From this point of view, the upper limit for the concentration of the stimulated emission compound is normally 1 wt % or less, or preferably 0.01 wt % or less, or more preferably less than 0.001 wt %.

It goes without saying that the type of the organic dye or organic pigment to be doped is not particularly limited. It just suffices to select various organic dyes or organic pigment according to the wavelength of the light one wishes to amplify. For example, organic dye or organic pigment which can be used in the optical fiber amplifier of the present invention are listed in Table 1.

TABLE 1

1. Rhodamine 6G
2. Rhodamine 6G Tetrafluoroborate

TABLE 1-continued

3. Rhodamine 6G Perchlorate
4. Rhodamine B
5. Rhodamine 19 Perchlorate
6. Rhodamine 101 Inner salt
7. Rhodamine 110
8. Cresyl Violet Perchlorate
9. Coumarin 120
10. Coumarin 2
11. Coumarin 339
12. Coumarin 1
13. Coumarin 138
14. Coumarin 106
15. Coumarin 102
16. Coumarin 314T
17. Coumarin 338
18. Coumarin 151
19. Coumarin 4
20. Coumarin 314
21. Coumarin 30
22. Coumarin 500
23. Coumarin 307
24. Coumarin 334
25. Coumarin 7
26. Coumarin 343
27. Coumarin 337
28. Coumarin 6
29. Coumarin 152
30. Coumarin 153
31. Carbostyril 124
32. POPOP
33. HPTS
34. Fluorescein
35. 2',7'-Dichlorofluorescein
36. Sulforhodamine B
37. Sulforhodamine 101
38. DODC Iodide
39. Oxazine 4 Perchlorate
40. DCH
41. Oxazine 170 Perchlorate
42. Nile Blue A Perchlorate
43. Oxazine 1 Perchlorate
44. Pyridine 1
45. Styryl 7
46. HIDC Iodide
47. DTDC Iodide
48. Cryptocyanine
49. DOTC Iodide
50. HITC Perchlorate
51. HITC Iodide
52. DTTC Iodide
53. DTTC Perchlorate
54. IR-144
55. HDITC Perchlorate
56. IR-140
57. IR-132
58. IR-125

The optical fiber amplifier of the present invention into which these organic dyes or organic pigments are doped can be manufactured by various methods including the GI type polymer optical fiber manufacturing method which has been proposed by the inventor of the present invention. In particular, GI type polymer optical fibers can be manufactured by organic dye or mixing organic dye or organic pigment with monomers beforehand and polymerizing the mixture.

One of the useful methods is like this: monomers for the desired refractive index profile and organic dyes or organic pigments are put in hollow-tube like polymers which are suitably considered to form a specified refractive index profile together with polymerization initiators. These materials are then polymerized and solidified, and the resulting preforms are thermally drawn to derive fibers of the desired diameter.

The optical fibers of the present invention are manufactured by utilizing the interfacial gel copolymerization method (Y. Koike, Polymer 32, 1737 [1991]) using selective diffusion of, for example, benzylmethacrylate, ethylene glycol dimethacrylate, vinyl benzoate, vinylphenylacetate, etc. as monomers to give polymers of high refractive index, and methylmethacrylate, etc. as monomers to give polymers of low refractive index.

Alternatively, the following two methods are also available: one is the interfacial gel method in which acrylic monomers are placed in a transparent hollow polymerization tube consisting of acrylic polymers which dissolve in acrylic monomers. The radical polymerization proceeds while the polymers of said hollow tube walls dissolve to monomers. The other is the interfacial gel method in which a suitable quantity of low molecular weight compounds, which can dissolve in polymers such as benzylphthalate n-butyl, is mixed with monomers such as methyl methacrylate and the resulting mixture is placed in a transparent hollow tube made of the same monomers for radical polymerization.

To dope during manufacturing, an appropriate quantity of the above-mentioned stimulated emission compounds such as organic dye or organic pigment is mixed with monomers and the resulting mixture is polymerized.

It is also possible to dope organic dye or organic pigment to the manufactured GI type polymer optical fibers by impregnating the fibers with an organic dye or organic pigment solution consisting of organic dye or organic pigment dissolved in an adequate solvent, and then drying the fibers. The cores must be doped in the case of SI and SM type optical fibers whereas the stimulated emission compounds must substantially be doped uniformly into the entire fibers in the case of GI type.

It goes without saying that the optical fiber amplifier of the present invention has various aspects. For example, the compounds having the stimulated emission function of the present invention may be doped as mentioned above to have them contained in the polymers, or said compounds may be added to the polymers as pendant.

Alternatively, these compounds may be added to and polymerized with monomers or oligomers. Further, organic complexes or inorganic substances may also be used in place of organic dye or organic pigment compounds to derive the same effect. With regard to the systems as the use aspects, various aspects are possible in like manner.

With the polymer optical fiber amplifier of the present invention whose construction is shown in FIG. 2, when excitation light (a) and signal light (b) are incident upon the end face of the GI type polymer optical fibers (5) containing stimulated emission compounds, the stimulated emission compounds contained in the optical fibers are excited by the excitation light. When the signal light is incident upon said excited state, said signal light is amplified by stimulated emission. Accordingly, the amplified signal light can easily be picked by separating the emergent light from the other end of the fiber with an appropriate spectroscope (8). For example, light signal of 1 mW to 10 W intensity can be amplified.

Excitation light to excite the polymer optical fiber amplifier is not necessarily incident on the end face as shown in the example in FIG. 2, but may be incident on the side of the polymer optical fiber amplifier. Signal light, on the other hand, must be incident on the end face of the fiber because it is normally weak.

The present invention is disclosed in more detail by referring to the manufacturing and working examples below.

MANUFACTURING EXAMPLE 1

(Manufacture of Fibers)

(1) A mixed solution of 27 g methylmethacrylate (MMA), 0.5 wt % benzoyl peroxide and 0.2 wt % n-butyl mercaptan (monomer ratio, respectively) was put in a Pirex-made cylindrical polymerization tube approximately 12 mm in outside diameter, 10 mm in inside diameter and 40 cm long after nitrogen substitution.

(2) The solution was heated to and kept at 70° C. for approximately 20 hours in a dryer while the tube was turned at a speed of approximately 2,000 rpm around the center axis of the tube which was supported horizontally.

(3) Hollow polymethylmethacrylate (PMMA) was manufactured by polymerization and solidification. It was recovered by opening the polymerization tube.

(4) A mixed solution of 10 g methylmethacrylate (MMA), 0.5 wt % perhexa 3M, 0.15 wt % n-butyl mercaptan, 20 wt % benzylphthalate n-butyl, and 0.004 wt % organic dye or organic pigment (Rhodamine 6G, etc.) (monomer ratio, respectively) was put in the hollow part of the hollow tube after nitrogen substitution.

(5) The solution was heated to and kept at 95° C. for approximately 20 hours in a dryer for polymerization while the polymer tube was turned slowly (approximately 50 rpm) around the center axis of the tube which was supported horizontally.

(6) The tube rotation was stopped; the tube was moved to a dryer of 110° C.; and the content was heat treated for approximately 20 hours.

(7) Heat treatment was performed for approximately 30 hours at 110° C. and 1 mmHg. Refractive index profile of the derived preforms is shown in FIG. 1. The refractive index profile was measured by the longitudinal direction interference phase-contrast method using an interference phase-contrast microscope supplied by Carl Zeiss aus Jena. The sample for measurement was prepared by cutting a disc approximately 1 mm thick out of a preform at the center, and both sides of the disc were ground. The horizontal axis of the graph in FIG. 1 is for the normalizing radius of the preform. Rp is the radius of the preform and r the distance from the center of the preform. The vertical axis is for the refractive index difference with reference to the refractive index of the preform at the center.

(8) Preforms thus prepared were heated to above Tg, thermally stretched (drawn), and finished into organic dye or organic pigment doped polymer optical fibers. Optical fibers of several thicknesses (fiber diameter 50 to 500 μm) were manufactured by adjusting the preform supply speed on the thermal stretcher and the optical fiber winding speed.

MANUFACTURING EXAMPLE 2

(Manufacture of Fibers)

(1) A mixed solution of 27 g methylmethacrylate (MMA), 0.5 wt % benzoyl peroxide and 0.2 wt % n-butyl mercaptan (monomer ratio, respectively) was put in a Pirex-made cylindrical polymerization tube approximately 12 mm in outside diameter, 10 mm in inside diameter and 40 cm long after nitrogen substitution.

(2) The solution was heated to and kept at 70° C. for approximately 20 hours in a dryer while the tube was turned at a speed of approximately 2,000 rpm around the center axis of the tube which was supported horizontally.

(3) Hollow polymethylmethacrylate (PMMA) was manufactured by polymerization and solidification. It was recovered by opening the polymerization tube (4) A mixed solution of 10 g methylmethacrylate (MMA), 0.5 wt % perhexa 3M, 0.15 wt % n-butyl mercaptan, 20 wt % benzylphthalate n-butyl, and 0.01 ppm organic dye or organic pigment (Rhodamine 6G, etc.) (monomer ratio, respectively) was put in the hollow part of the hollow tube after nitrogen substitution.

(5) The solution was heated to and kept at 95° C. for approximately 20 hours in a dryer for polymerization while the polymer tube was turned slowly (approximately 50 rpm) around the center axis of the tube which was supported horizontally.

(6) The tube rotation was stopped; the tube was moved to a dryer of 110° C.; and the content was heat treated for approximately 20 hours.

(7) Heat treatment was performed for approximately 30 hours at 110° and 1 mmHg. Refractive index profile of the derived preforms was measured by the longitudinal direction interference phase-contrast method using an interference phase-contrast microscope supplied by Carl Zeiss aus Jena in the same way as in manufacturing example 1.

(8) Preforms thus prepared were heated to above Tg, thermally stretched (drawn), and finished into organic dye or organic pigment doped polymer optical fibers. Optical fibers of several thicknesses (fiber diameter 50 to 500 μm) were manufactured by adjusting the preform supply speed on the thermal stretcher and the optical fiber winding speed.

EXAMPLE 1

(Optical Fiber Amplifier)

(1) The end face of the organic dye or organic pigment doped polymer optical fiber manufactured according to manufacturing examples 1 and 2 was ground and the amplifying performance was evaluated with a measuring system shown in FIG. 2.

(2) That is, 10 ns pulse light (wavelength 1064 nm) from an Nd:YAG laser (1) was shed on KD* P single crystals (2) to generate SH (secondary harmonics) wave (wavelength 532 nm), which were split into two by the beam splitter (3). One of the two split beams, or excitation light (a), was incident on the organic dye or organic pigment doped polymer optical fiber (5) while the other was used as excitation light for the dye laser (6). Light (wavelength 592 nm) from the dye laser (6) was reflected from the beam splitter (7) and input into the end face to join the excitation light (a).

(3) The emergent light from the organic dye or organic pigment doped polymer optical fiber (5) was input into spectroscope (8) to pick only 600 nm (in the case of Rhodamine 6G doped polymer optical fiber), which was, detected by a photomultiplier (9) connected to a high stability power supply (12). Signals from the photomultiplier (9) were processed on an oscilloscope (10) and a boxcar integrator (11).

(4) With the above process, we first shed excitation light only, and confirmed that the intensity of the emergent light was zero. This confirmed that the occurrence of ASE (amplified natural emissions) was sufficiently small compared with the level of signal light.

(5) The intensity of the excitation light was varied with an ND filter (4) and the variable intensity of light was measured at position A with a power meter to determine amplification factor. The result is shown in FIG. 3. The amplification factor was measured with reference to the intensity of signal light when the intensity of excitation light was zero.

These results show that the optical fiber amplifier of the present invention has a large amplifying effect.

In FIG. 3, SH waves are used after they are divided into two. One is used as excitation light for the amplifier of the present invention, and the other as the excitation light for the dye laser. The latter is generated by another laser light (different from SH waves), and is used as the signal light (b) for the amplifier. That is, since the other one of the two divided SH waves is simply used as excitation light for the dye laser, excitation light directly incident on the amplifier and the signal light may be said to derive from a different and independent light source, respectively.

Industrial Applicability

As described above in detail, the present invention realizes an optical fiber amplifier having an amplification function for the first time as fiber plastics.

We claim:

1. A polymer optical fiber amplifier characterized by being composed of GI type plastic optical fibers of polymers containing organic stimulated emission compounds of concentration less than 0.001 wt %.

2. The plastic optical fiber amplifier of claim 1 wherein signal light which is separate from and independent of excitation light is amplified.

3. A polymer optical fiber amplifier according to claim 1, wherein the organic stimulated emission compound is an organic dye or organic pigment.

* * * * *